United States Patent [19]
Teng et al.

[11] Patent Number: 5,958,543
[45] Date of Patent: Sep. 28, 1999

[54] MICRO-TEXTURING FOR SPUTTERED, THIN FILM MAGNETIC MEDIA DISKS UTILIZING TITANIUM SPUTTERED IN THE PRESENCE OF HYDROGEN TO FORM MICRO-TEXTURING

[75] Inventors: Edward F. Teng, Sunnyvale; Phuong Nguyen, Milpitas; Atef H. Eltoukhy, Saratoga, all of Calif.

[73] Assignee: Stor Media, Inc., San Jose, Calif.

[21] Appl. No.: 08/673,342

[22] Filed: Jun. 28, 1996

Related U.S. Application Data

[60] Provisional application No. 60/000,949, Jul. 7, 1995.

[51] Int. Cl.$^6$ ........................................ G11B 5/66
[52] U.S. Cl. .................. 428/65.3; 428/65.5; 428/141; 428/694 T; 428/694 TS; 428/694 SG; 428/900; 204/192.2

[58] Field of Search ........................... 428/694 T, 694 TS, 428/694 SG, 900, 65.3, 65.5, 141; 204/192.2

[56] References Cited

U.S. PATENT DOCUMENTS 5,466,522  11/1995  Freeman .................................. 428/332
5,635,269  6/1997  Weir ....................................... 428/65.3

FOREIGN PATENT DOCUMENTS 0079391  5/1983  European Pat. Off. .

*Primary Examiner*—Leszek Kiliman
*Attorney, Agent, or Firm*—Lahive & Cockfield

[57] ABSTRACT

Hydrogen-treated, sputter deposited, titanium nodules providing enhanced micro-texturing for thin film, magnetic, disk media.

2 Claims, 5 Drawing Sheets

NiP/Al SUBSTRATE

GLASS SUBSTRATE

MICRO-TEXTURING FOR SPUTTERED, THIN FILM MAGNETIC MEDIA DISKS UTILIZING TITANIUM SPUTTERED IN THE PRESENCE OF HYDROGEN TO FORM MICRO-TEXTURING

This application claims the benefit of U.S. provisional application Ser. No. 60/000,949, filed Jul. 7, 1995.

GENERAL BACKGROUND

This inventive concept relates to the unique formation of hydrogen modified, titanium micro-texturing where titanium is sputter deposited on a thin film, magnetic media disk substrate in the presence of hydrogen (normally 5 to 10 atomic percent hydrogen content in the usual argon gas sputtering environment) to form micro-texturing bumps or nodules.

This technique produces a uniquely uniform, especially small micro-texturing, (when compared with texturing produced by laser texturing,) having advantageously high hardness and markedly improved glide characteristics, i.e., contact-start-stop (CSS) characteristics.

PRIOR ART OF INTEREST

One prior art item of interest is European Patent Application 079 391 (Kawana) assigned to Sony. This case has a United States patent counterpart, i.e., Kawana U.S. Pat. No. 4,696,862 (Sep. 29, 1987).

This EPO application 079 391, although directed specifically to tape-type thin film media, discloses the use of sputtered aluminum or titanium to form discrete islands which have a thickness in the range of 10 to 1000 angstroms, with a mean thickness of 300 angstroms (Page 3 of EPO disclosure in first full paragraph).

These sputter-formed aluminum or titanium islands are subjected to nitrogen plasma to form nitrogenated aluminum or titanium configurations (Page 3 at last full paragraph).

The disclosed purpose of the nitrogenated aluminum or titanium "islands" is to enhance adhesion between the substrate and the magnetic layers as opposed to providing surface texturing or roughness.

Another prior art item of interest is a United States Luthier et al U.S. Pat. No. 5,030,522. This patent does not relate to surface texturing but does disclose a technique for forming nitrogenated aluminum or titanium by utilizing sputtering targets containing aluminum or nitride.

Sputtered globule formations for disk media texturing are discussed and described in patents such as Baseman et al U.S. Pat. Nos. 5,053,250 and 5,134,038. In each case these Baseman (IBM) disclosures appear to contemplate reactivity between the globules and the magnetic layer, with the globules themselves being from "gallium, indium, tin, bismuth, lead, cadmium, mercury, selenium, tellurium" and their alloys with other metals including "silver, palladium, or gold" as well as binary or ternary compounds of the transient metal elements themselves. Other prior art disclosures feature non-reactive, sputtered globule, micro-texturing.

Other state of the art disclosures which are of general interest may be summarized as follows:

| Patent # | Inventor/Assignee | Subject Matter |
|---|---|---|
| 4,828,899 | Arioka et al/TDK Corp. | Examples of the particles which can be used herein include $SiO_2$ (colloidal silica), $Al_2O_3$ (alumina sol), MgO, $TiO_2$, ZnO, $Fe_2O_3$, zirconia, CdO, NiO, $CaWO_4$, $CaCO_3$, $BaCO_3$, $CoCO_3$, $BaTiO_3$, Ti (titanium black), Au, Ag, Cu, Ni, Fe, Various hydrosols, and resinous particles. Inorganic particles are preferred among others. |
| 5,079,062 | Masuda et al/Hitachi, Ltd. | Ground substrate (NiP/A1) particles. |
| 5,082,709 | Suzuki et al/Matsushita Electric Industrial Co. | In this case, examples of the non-magnetic fine particles include inorganic fine particles of alumina, silica, titanium oxide or the like, fine particles of a polymer compound of polyester, polyamide, polyarylate, polysulfone, polyphenylene oxide, polyimide, epoxy; cross-linked styrene, cross-linked acryl, cross-linked benzoguanamine, cross-linked melamine or the like, fine particles of carbon, and fine particles of a hydrolysate of metal alkoxide. |
| 5,087,482 | Kawai et al/Hoya Corp. | The hard minute particles may be any other inorganic minute particles than minute silica and aluminum particles and may be, for example, minute particles of zirconia, titania, silicon carbide, tungsten carbide, or the like. In the hard minute particles, different species of particles may be mixed together. |
| 5,091,225 | Goto/NEC Corporation | Fine particles of Pd, Au, Ag or the like, which acts as a catalyst for a plating reaction are adhered to the surface of the base plate. |

The present invention departs from prior art teachings as noted above and entails the following concepts.

SUMMARY OF THE INVENTION

A method for micro-texturing thin film, sputter deposited magnetic media is herein presented, this method comprising:
  providing a substrate disk to receive sputter deposited magnetic media;
  providing a titanium target in titanium material transmitting proximity to the substrate in a sputtering environment;
  providing a hydrogen gas content in a gaseous environment for the sputtering of titanium from the titanium target onto the magnetic media substrate disk; and
  sputter depositing titanium from the titanium target in the presence of the hydrogen to form hydrogen-treated titanium nodules (i.e., bump-like configurations) on the substrate.

The related apparatus concept of this invention for micro-texturing thin film, sputter deposited magnetic media, entails:
  handling and transporting means providing a substrate disk to receive sputter deposited magnetic media;
  sputtering system and target means providing a titanium target in titanium material transmitting proximity to the substrate in a sputtering environment;
  sputtering environment means providing a hydrogen gas content in a gaseous environment for the sputtering of titanium from the titanium target onto the magnetic media substrate disk; and
  sputtering system means for sputter depositing titanium from the titanium target in the presence of the hydrogen to form hydrogen-treated titanium nodules (i.e., bump-like configurations) on the substrate.

A micro-textured, thin film, sputter deposited, magnetic media disk yielded through the practice of this invention comprises:

a substrate disk;

sputter deposited, hydrogen-modified, titanium sputtered from a titanium target in the presence of hydrogen to form hydrogen-treated, titanium nodules (i.e., bump-like configurations) on the substrate disk.

With the invention aspects having been summarized, it is now appropriate to review the presently preferred embodiment, with appropriate reference being made to appended drawings.

DRAWINGS

In the drawings:

FIG. 1 provides an optical picture of hydrogenated titanium on Nip/Al and glass substrates (at 300X);

Figure 5:
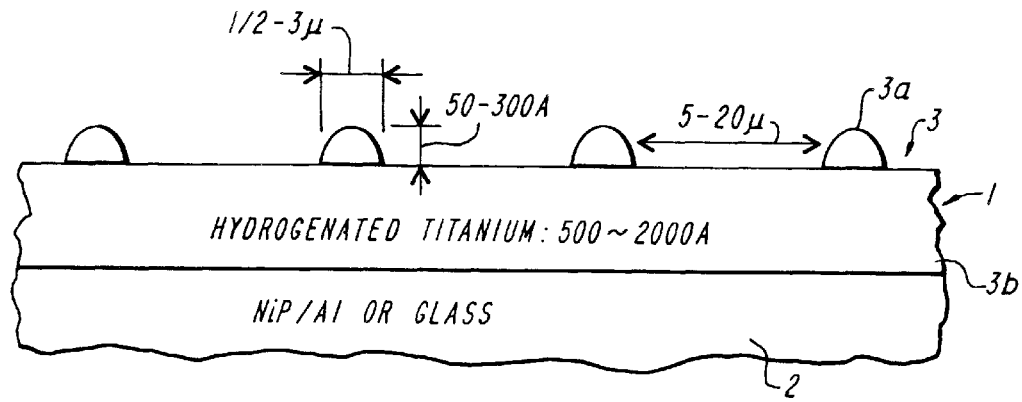
Figure 6:
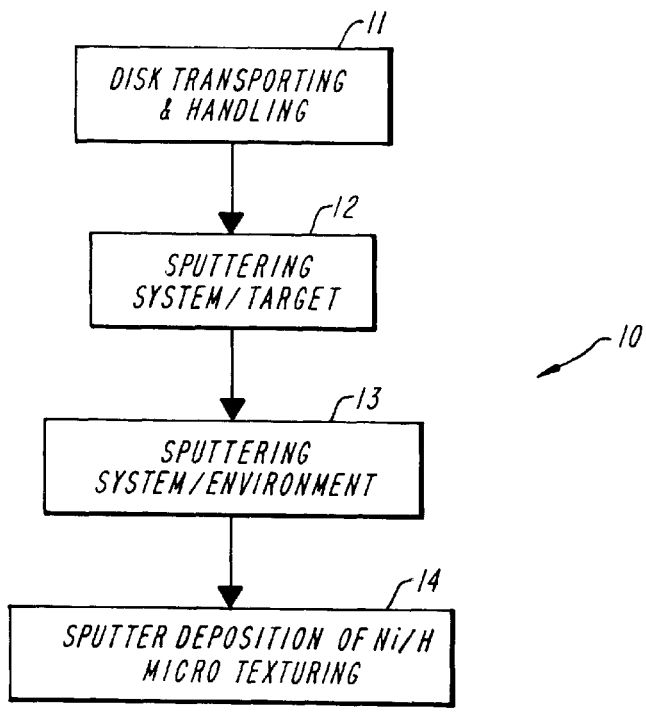

FIG. 5 schematically illustrates, in a cross sectional format, a representative, sputtered and hydrogen modified titanium micro-texturing resulting from this invention; and FIG. 6 schematically depicts an apparatus assemblage employed to produce a disk as shown in FIG. 5.

PREFERRED EMBODIMENTS

As used in this presentation:

Nip/Al=Nickel/phosphorous plated aluminum substrate disk.

CSS=Contact/Start/Stop data.

Turning now to the presently preferred mode of this invention, it is to be noted that titanium reacts with or is modified by hydrogen in a sputtering environment to form hydrogenated titanium or hydrogen modified titanium. Numerous separated, hard little bumps or nodules were observed on the disk surface of disks treated with this technique.

Data developed to date reflects the attainment of sputter induced micro-texturing of titanium with hydrogen present in the usual argon gas sputtering environment, the bumps produced being generally in the following dimensional ranges:

Height of bumps (LH)=about 50–300 angstroms.

Diameter of bumps (D)=about ½ to 3 microns.

Distance between bumps (S)=about 5 to 20 microns.

Figure 1A:
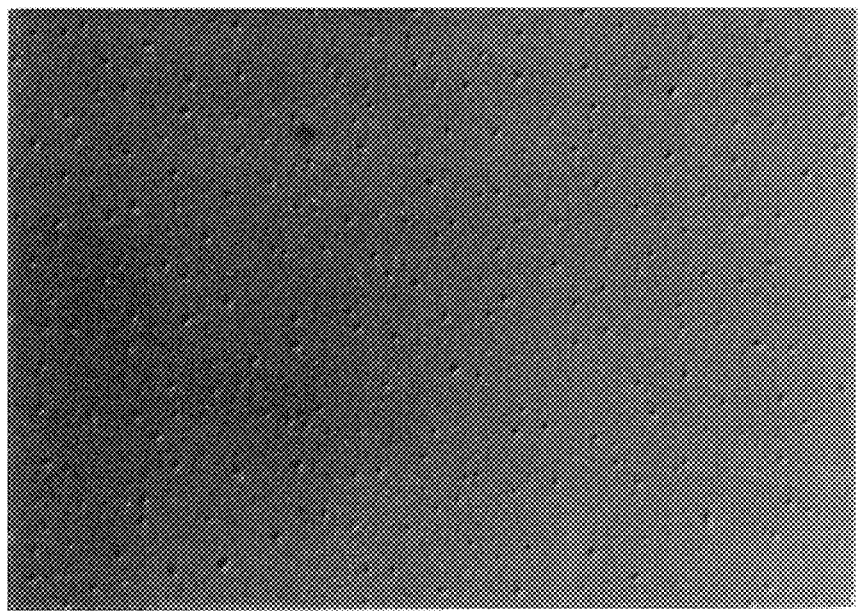
Figure 1B:
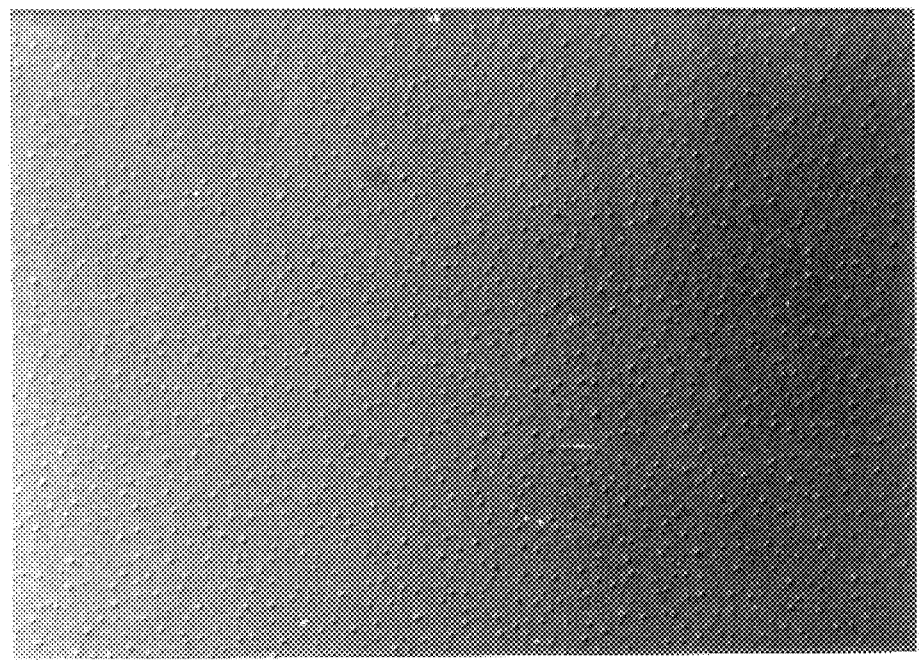
Figure 2A:
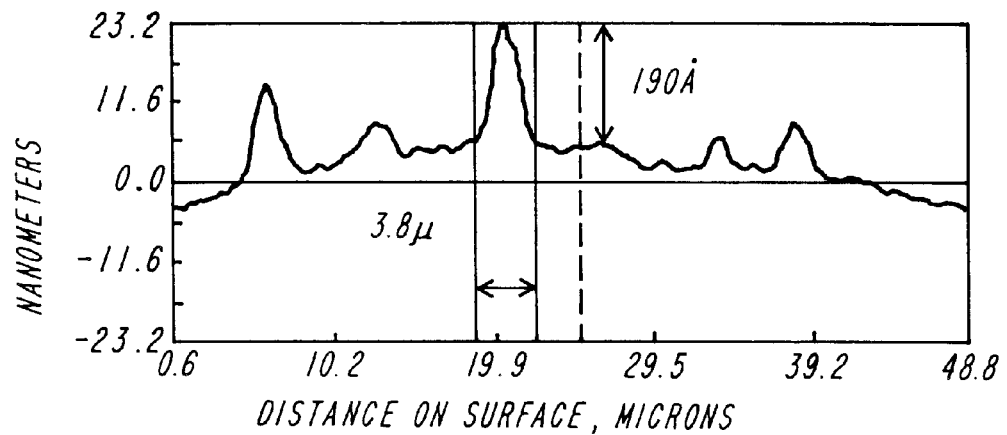
FIG. 2 illustrates a Wyko profile of hydrogenated titanium on Nip/Al substrate.
Figure 2B:
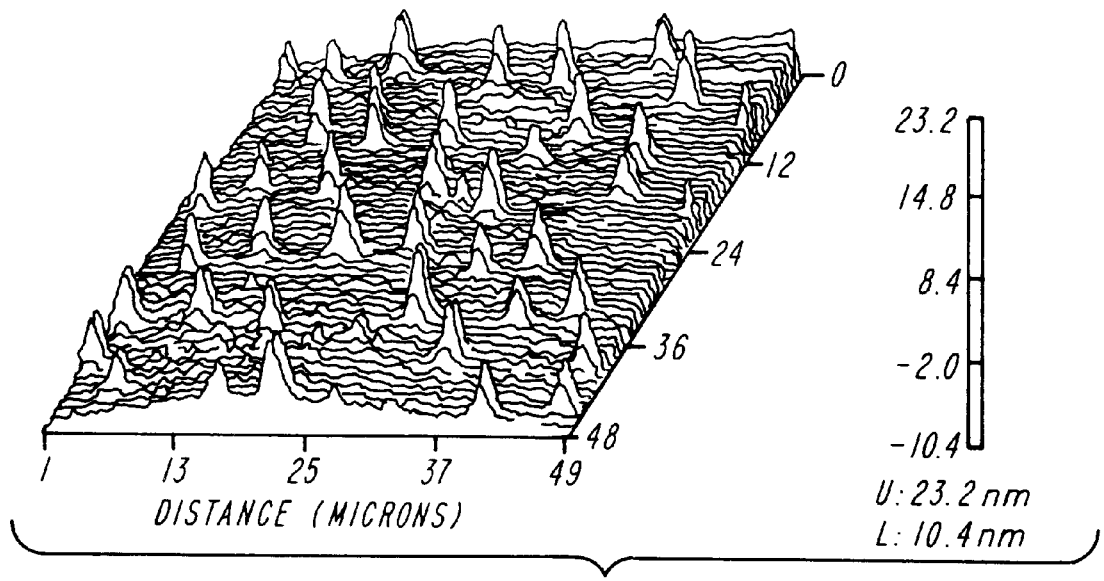
Figure 3:
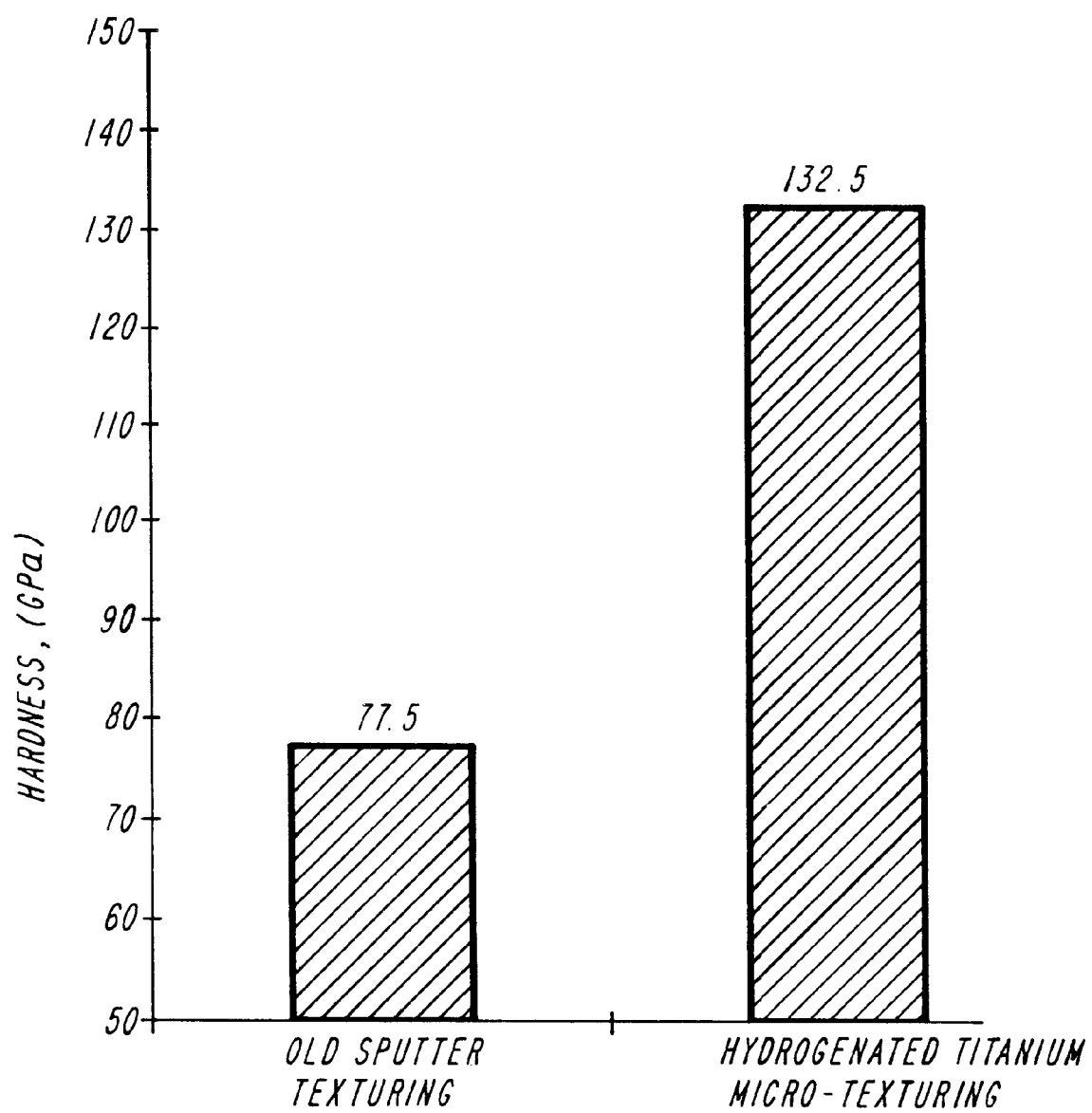
FIG. 3 illustrates hardness comparisons between a prior art sputter textured disk, and the hydrogenated titanium micro-texture disk.
Figure 4A:
FIG. 4 illustrates CSS data comparison between the "old" or prior art sputter textured disk (A) and hydrogenated titanium disks (B)
Figure 4B:
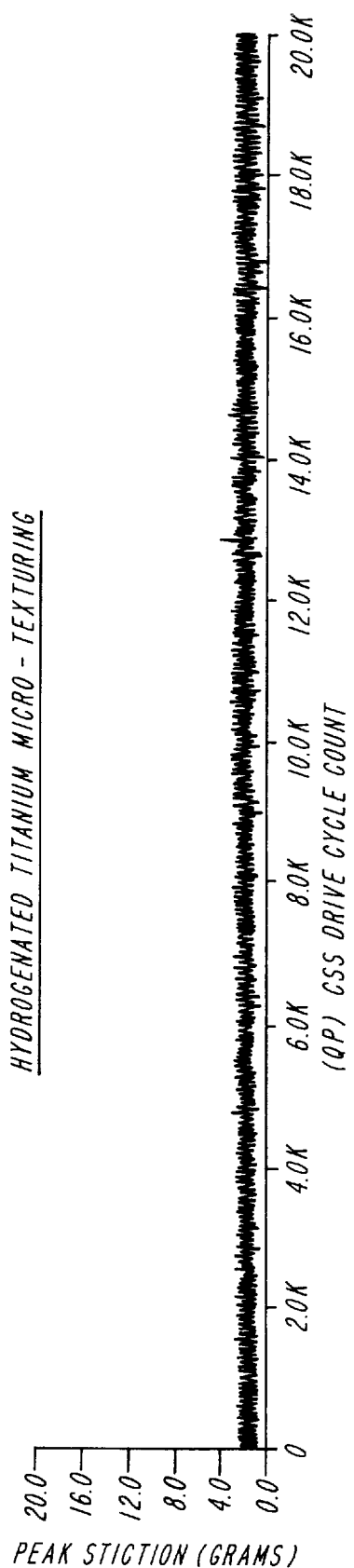

A representative sputtered, hydrogen modified titanium micro-texturing of this nature is schematically illustrated in FIG. 5. Comparative advantages and characteristics of the invention are shown in the other drawing figures, as follows:

FIG. 1 provides an optical picture of hydrogenated titanium on Nip/Al and glass substrates (at 300X);

FIG. 2 illustrates a Wyko profile of hydrogenated titanium on Nip/Al substrate, evidencing nodule uniformity;

FIG. 3 illustrates hardness comparisons between a prior art sputter textured disk, and the hydrogenated titanium micro-texture disk evidencing the improved hardness of the texturing nodules of this invention; and FIG. 4 illustrates CSS data comparison between the "old" or prior art, sputter textured disk (A) and hydrogenated titanium disks (B) and shows a remarkable improvement in CSS characteristics.

Significantly, hydrogen forward scattering techniques indicate that with the presence of hydrogen, the hydrogen atomic percent concentration of hydrogen in portions of the sputtered titanium was as high as about ten percent. This may well contribute to the above noted enhancement of hardness.

In summarizing this invention, the following delineations may be useful in expressing the fundamental concepts herein presented.

Disc Concept

The micro-textured, thin film, sputter deposited, magnetic media disk 1 produced by this invention comprises:

a substrate disk 2;

sputter deposited, hydrogen-modified titanium 3 sputtered from a titanium target in the presence of hydrogen to form hydrogen-treated, titanium nodules 3a (i.e., bump-like configurations) on the substrate disk 2 projecting from the sputtered titanium base 3b. (The titanium base 3b may have a thickness of 500 to 2000 angstroms, as shown in FIG. 5.)

As also shown in FIG. 5, the sputtered titanium will produce hydrogen treated titanium nodules 3a projecting from base 3b, having a height of about 50 to about 300 angstroms, a diameter of about ½ to to about 3 microns, and possibly as much as about 5 microns, and a nodule spacing on the order of about 5 to 20 microns.

Apparatus Concept

The apparatus 10 for producing micro-textured thin film, sputter deposited magnetic media 1, as schematically shown in FIG. 6, comprises:

disk transporting and handling means 11 providing a substrate disk 2 to receive sputter deposited magnetic media;

sputtering system and target means 12 providing a titanium target in titanium material transmitting proximity to the substrate 2 in a sputtering environment;

sputter system environment means 13 providing a hydrogen gas content in a gaseous environment for the sputtering of titanium from the titanium target onto the magnetic media substrate disk 2; and sputtering system means 12 & 13 comprising system 14 for sputter depositing titanium from the titanium target in the presence of the hydrogen to form hydrogen-treated, titanium nodules (i.e., bump-like configurations) on said substrate 2.

As will be appreciated, conventional, commercially available disk handling and sputtering system apparatus may be employed in this apparatus assemblage.

Method Concept

The unique method for micro-texturing thin film, sputter deposited magnetic media, as herein presented comprises:

providing a substrate disk 2 to receive sputter deposited magnetic media;

providing a titanium target in titanium material transmitting proximity to the substrate 2 in a sputtering environment 13;

providing a hydrogen gas content in a gaseous environment 13 for the sputtering of titanium from the titanium target onto the magnetic media substrate disk 2; and sputter depositing titanium from the titanium target in the presence of the hydrogen to form hydrogen-treated, titanium nodules (i.e., bump-like configurations) on the substrate 2.

Thereafter, thin film magnetic media and a protective outer layer or overcoat will be sputter deposited on the micro-textured substrate. The substrate texturing will be substantially transmitted through the media and overcoat to provide disk surface texturing.

SUMMARY OF ADVANTAGES, NON-OBVIOUSNESS AND SCOPE OF INVENTION

The unique approach to micro-texturing provided through the present invention, entailing hydrogen modification of sputter deposited titanium nodules on a disk substrate, significantly improves disk characteristics.

Contact-start-stop characteristics are ameliorated, thereby significantly reducing stiction problems.

The advantageously high hardness characteristics of the nitrogen-treated titanium nodules in this micro-texturing are believed to significantly improve the integrity of the texturing, with the nitrogen-treated titanium nodules improving overall glide characteristics.

The enhanced hardness of the micro-texturing may well constitute a factor contributing to the unique uniformity of nodule configuration and dispersion, thereby providing a more uniform and reliable disk product.

Those skilled in the thin film disk manufacturing art and familiar with this disclosure will recognize that the prior art, exemplified as set forth at the outset of this presentation, fails to anticipate or suggest the nitrogen-treated, titanium nodule, micro texturing concept of this invention, thereby evidencing its non-obviousness.

Those familiar with this disclosure and skilled in this art may well recognize additions, deletions, substitutions, or other modifications and/or equivalent configurations, which would fall within the scope of the invention as delineated in the appended claims.

What is claimed is:

1. A micro-textured, thin film, sputter deposited, magnetic media disk comprising:

a substrate disk;

sputter deposited, hydrogen-modified titanium sputtered from a titanium target in the presence of hydrogen to form hydrogen-treated, titanium nodules on said substrate disk;

thin film magnetic media sputter deposited over said hydrogen-treated, titanium nodules; and a protective outer layer sputter deposited over said thin film magnetic media said hydrogen-treated titanium nodules defining substrate disk texturing which is transmitted through said magnetic media and protective outer layer to provide disk surface texturing;

said hydrogen-treated titanium nodules
    containing hydrogen,
    having a height of from, 50 to 300 angstroms,
    having a diameter of from 0.5 to 3 microns, and
    having a distance between nodules of 5 to 20 microns.

2. A disk as described in claim 1 wherein:

said hydrogen is operable to increase the hardness of said titanium in said nodules; and said hydrogen-treated titanium nodules are formed so as to be substantially uniform in height and spacing and are operable to reduce CSS disk properties.

\* \* \* \* \*